United States Patent
Chase et al.

(10) Patent No.: US 12,441,907 B2
(45) Date of Patent: Oct. 14, 2025

(54) NIR LIGHT SCATTERING COATINGS AND COMPOSITIONS FOR PREPARING THEM

(71) Applicant: BASF Coatings GmbH, Münster (DE)

(72) Inventors: Thomas Chase, Wyandotte, MI (US); Matthew Ian Childers, Southfield, MI (US); Yunus Emre Kurtoglu, Southfield, MI (US); Markus Mundus, Münster (DE)

(73) Assignee: BASF COATINGS GMBH, Muenster (DE)

( * ) Notice: Subject to any disclaimer, the term of this patent is extended or adjusted under 35 U.S.C. 154(b) by 798 days.

(21) Appl. No.: 17/768,580

(22) PCT Filed: Oct. 16, 2020

(86) PCT No.: PCT/EP2020/079154
§ 371 (c)(1),
(2) Date: Apr. 13, 2022

(87) PCT Pub. No.: WO2021/074360
PCT Pub. Date: Apr. 22, 2021

(65) Prior Publication Data
US 2024/0101861 A1   Mar. 28, 2024

(30) Foreign Application Priority Data
Oct. 17, 2019  (EP) ..................... 19203762

(51) Int. Cl.
*C09D 175/04*   (2006.01)
*C08K 3/08*   (2006.01)
(Continued)

(52) U.S. Cl.
CPC .......... *C09D 175/04* (2013.01); *C09D 5/002* (2013.01); *C09D 5/004* (2013.01); *C09D 7/61* (2018.01);
(Continued)

(58) Field of Classification Search
CPC .......... C09D 175/04; C09D 7/61; C09D 7/67; C09D 7/68; C09D 5/002; C09D 5/004;
(Continued)

(56) References Cited

U.S. PATENT DOCUMENTS

2009/0035475 A1  2/2009  Uemura et al.
2010/0180796 A1  7/2010  Kitamura et al.
(Continued)

FOREIGN PATENT DOCUMENTS

EP   2759854 A1   7/2014
JP   2013080222 A   5/2013
(Continued)

OTHER PUBLICATIONS

International Search Report and Written Opinion for corresponding PCT/EP2020/079154 mailed Jan. 25, 2021, 8 Pages.

*Primary Examiner* — Robert S Jones, Jr.
*Assistant Examiner* — Elizabeth Amato
(74) *Attorney, Agent, or Firm* — Armstrong Teasdale LLP (57) ABSTRACT

Disclosed herein is a coating composition being a basecoat or a clearcoat composition and including at least one polymer as a film-forming binder (A), nanoparticles (B) containing at least one noble metal and/or at least one alloy and/or oxide thereof, as well as water and/or at least one organic solvent as component (C) being present in the coating composition in an amount of at least 30 wt.-%, based on the total weight of the composition. Further disclosed herein are a coating film and a coating obtainable from the coating composition, a method of forming a coating film and a coating at least partially onto at least one surface of a substrate, and an at least partially coated substrate obtainable by the method.

24 Claims, 2 Drawing Sheets

(51) Int. Cl.
    *C08K 3/36*     (2006.01)
    *C08K 9/02*     (2006.01)
    *C09D 5/00*     (2006.01)
    *C09D 5/33*     (2006.01)
    *C09D 7/40*     (2018.01)
    *C09D 7/61*     (2018.01)

(52) U.S. Cl.
CPC .............. *C09D 7/67* (2018.01); *C09D 7/68* (2018.01); *C08K 3/08* (2013.01); *C08K 2003/0831* (2013.01); *C08K 3/36* (2013.01); *C08K 9/02* (2013.01)

(58) Field of Classification Search
CPC ... C08K 3/08; C08K 3/36; C08K 9/02; C08K 2003/0831
See application file for complete search history.

(56) References Cited

U.S. PATENT DOCUMENTS

2014/0186608 A1\*   7/2014   Ohzeki ................. C08J 7/0427
                                                        428/220
2014/0212655 A1     7/2014   Matsuno et al.
2016/0290036 A1\*  10/2016   Nukui .................... B32B 27/20

FOREIGN PATENT DOCUMENTS

JP           2013083974 A     5/2013
JP           2015104707 A     6/2015

\* cited by examiner

Fig. 1

Fig. 2

NIR LIGHT SCATTERING COATINGS AND COMPOSITIONS FOR PREPARING THEM

CROSS-REFERENCE TO RELATED APPLICATIONS

This application is a U.S. National Phase Application of International Patent Application No. PCT/EP2020/079154, filed Oct. 16, 2020, which claims priority to European Patent Application No. 19203762.0, filed Oct. 17, 2019, each of which is hereby incorporated by reference herein.

The present invention relates to a coating composition being a basecoat or a clearcoat composition and comprising at least one polymer as film-forming binder (A), nanoparticles (B) containing at least one noble metal and/or at least one alloy and/or oxide thereof, wherein the noble metal is in each case independently selected from the group consisting of Au, Ag, Cu, Pd, Ru, Rh, Re, Ir, Os and Pt as well as mixtures thereof, wherein these nanoparticles have an average particle diameter in the range of from 20 nm to <500 nm and are present in the coating composition in an amount in the range of from 0.01 wt.-% to 10.0 wt.-%, based on the total solids content of the composition, as well as water and/or at least one organic solvent as component (C) being present in the coating composition in an amount of at least 30 wt.-%, based on the total weight of the composition, a coating film and a coating obtainable from the coating composition, a method of forming a coating film and a coating at least partially onto at least one surface of a substrate, and an at least partially coated substrate obtainable by the inventive method.

BACKGROUND OF THE INVENTION

Recent advances have been made in technologies related to self-driving ("autonomous") vehicles and other objects in a vehicle's surroundings including markings that are detectable by a sensor mounted on the autonomous vehicle. Autonomous vehicles use a combination of detecting systems, such as sensors, cameras, radar, ultrasonic, and lasers to detect and locate obstacles such that the autonomous vehicle can safely navigate around such objects. Some detecting systems are limited in their ability to detect objects at long distances or in non-ideal environments, such as in low-light conditions, in inclement weather, such as fog, rain, and snow, or in other conditions with light scattering particulates in the air (e.g., smog and dust). Such limitations may prohibit the autonomous from safely navigating obstacles.

LIDAR (light imaging, detection and ranging) is a remote-sensing technology that can be deployed within such autonomous vehicles as the primary source of object recognition. By illuminating the surrounding environment with laser light, LIDAR maps distances to objects in its path in real-time and can be paired with software to safely react to objects within their vicinity. For example, if an object gets too close to the vehicle, the software can react to avoid the object. LIDAR is known to utilize near-infrared light (near-IR light or NIR light) as its source of illumination, which poses challenges: although many light colored objects reflect this type of light with relative ease, especially dark colored and clear objects either absorb or pass the light, thus lowering resolution and leading to potential instances, where objects are not sufficiently observed by the LIDAR and avoided by autonomous vehicle systems. US 2016/0146926 A1 relates to a system comprising such a LIDAR device and a LIDAR target, and a retro-reflective material being in contact with the LIDAR target.

An object's ability to reflect light is dependent on its bulk and surface properties, and manifests itself as specular or diffuse. Specular reflection of light occurs when incident light stemming from a light source in a single direction is reflected into a single outgoing direction at the same angle as the incident wave. Diffuse reflection occurs when incident light stemming from a light source in a single direction is reflected at many angles. In theory both specular and diffuse reflection can be utilized in LIDAR technology for autonomous vehicles, but in practice this is much more difficult. With specular reflection, much of the luminance is observed at the angle of incident. Thus, for a moving vehicle with a detector positioned at the light source, this could prove problematic if the angle of incidence was positioned away from the tandem light source and detector. In contrast, diffuse reflection demonstrates equivalent luminance from all directions, which can alleviate this concern, and allows detection at all angles.

Most of the current coatings are applied to substrates such as vehicle bodies for improved durability and aesthetics, but usually impart no sufficient functionality in diffusely reflecting near-IR light for the purposes of greater visibility to LIDAR technology.

WO 2018/034261 A1 discloses a coating film having infrared light reflection and visible light transmission properties as well as a low haze. The coating film is fabricated using a coating material composition, which contains tabular pigment particles and a resin component. The tabular pigment particles are a laminate of a dielectric layer and a metal thin-film layer. In the laminate, the dielectric layer and the metal thin-film layer are alternately layered, and the dielectric layer is positioned outermost in the laminate. Therefore, at least two dielectric layers have to be present in the laminate. The pigment particles have an average primary particle size of 1.000 nm or more. The use of the pigment particles disclosed in WO 2018/034261 A1 results in an orientation of the particles in the coating when used in a spray application, which will give rise to a rather specular reflection, which in turn has the aforementioned disadvantage of limiting the angles, where the coated objects are to be detected with LIDAR. Further, by making use of pigment particles having such a comparably large particle size of 1.000 nm or more, often protrusion in the long direction is caused from the coating film, if the particles are not perfectly oriented. This will in turn lead to an undesired decrease of gloss and less acceptable appearance of the coating.

Further, US 2016/0152834 A1 discloses a decorative coating formed on the surface of a resin substrate for improving the gloss. The coating comprising fine particles made of silver or silver alloy that are dispersed in the coating and a light-transmissive binder resin that binds the particles. The substrates of US 2016/0152834 A1 are placed on a path of electromagnetic waves of a radar device. The particles are present in the coating in an amount of at least 85 to 99 wt.-%, based on the total weight of the coating disclosed in US 2016/0152834 A1 in order to ensure a sufficient metal gloss of the coating due to a "liquid metal effect" of the particles present. Any independent light scattering is not possible due to interaction of the particles with each other. Therefore, the coatings of US 2016/0152834 A1 cannot impart sufficient functionality in diffusely reflecting near-IR light for the purposes of greater visibility to LIDAR technology. In addition, these coatings may have a substantial effect on color, which is not desired.

GB 2,455,991 A discloses a method of giving an article a colored appearance when illuminated by light. The method comprises depositing a transparent inorganic coating on a surface of the article, e.g. by a PVD or CVD process, and incorporating a plurality of dispersed particles within the coating, which are able to generate a selectable color or hue by plasmon resonance. The coatings disclosed in this reference have a very specular particle reflection. Thus, LiDAR visibility is only enhanced at a very narrow range of angles close to the normal angle (due to metal orientation). Therefore, the coatings of GB 2,455,991 A cannot impart sufficient functionality in diffusely reflecting near-IR light for the purposes of greater visibility to LIDAR technology.

US 2018/0120435 A1 relates to a method for increasing a detection distance of a surface of an object such as a vehicle illuminated by near-IR electromagnetic radiation as well as to a corresponding detection system such a system for detecting proximity of vehicles, e.g., for use in LIDAR applications. Said object bears a NIR reflective coating, which may comprise a first (and NIR-transparent) layer and a second (and NIR-reflective) coating layer, wherein the second coating layer is underneath the first coating layer. The NIR-reflective layer comprises a NIR reflective pigment, whereas the NIR-transparent layer comprises a NIR-transparent pigment. Said second and NIR reflective layer may be a primer surfacer and the first and NIR transparent layer, which is applied onto the second layer, may be a color-imparting basecoat or may be a clear coat layer. Optionally, a clear coat layer may then be further applied onto the first layer. Alternatively, the first and NIR transparent layer may be a topcoat layer. However, incorporating the NIR-reflective pigment into the primer surfacer layer, i.e., into the second layer of the multicoats disclosed in US 2018/0120435 A1, requires comparably expensive NIR transparent (black) pigments to be present in the basecoat or topcoat applied thereon in order to make the layering effective, which is disadvantageous at least for economic reasons. In addition, this approach does, e.g., not allow using conventional carbon black pigments in the basecoat or topcoat. In addition, for conventional coating applications, it is usually preferred to have a primer color similar to the overall coating color, so that any chip failures to the primer layer if present are not as obvious. However, the approach disclosed in US 2018/0120435 A1 requires a white or light colored primer, which shows obvious failures when chipped. Finally, in case of refinishing, the approach of US 2018/0120435 A1 requires a primer (as second layer), a basecoat (as first layer) and a clearcoat or a primer and a topcoat layer to all be reapplied, i.e. the reapplication of at least two or three layers to the substrate used. It would, however, be desirable to reduce the number of layers to be reapplied as much as possible, in particular for economic and ecological reasons. In addition, the coatings of US 2018/0120435 A1 may have a substantial effect on color, which is not desired.

Thus, there is a demand for a coating that is able to enhance the reflection of NIR light with a scattering that is in particular diffuse in nature, in particular off dark and clear objects, while imparting little or no haze and/or color in the visible light range, i.e., minimal scattering and absorption in the visible spectra, in particular for the purposes of greater visibility to LIDAR technology. There is also a demand for such a coating further having further a good appearance and/or a good gloss, and which additionally allows to be prepared by an efficient, environment-friendly and less-cost intensive method in particular for refinish applications.

Problem

It has been therefore an object underlying the present invention to provide a coating that is able to enhance the reflection of NIR light with a scattering that is in particular diffuse in nature, in particular off dark and clear objects, while imparting little or no haze and/or color in the visible light range, i.e., minimal scattering and absorption in the visible spectra, in particular for the purposes of greater visibility to LIDAR technology. It has been a further object underlying the present invention to provide such a coating, that, in addition, exhibits good appearance properties and/or a good gloss, and which further allows to be prepared by an efficient, environment-friendly and less-cost intensive refinish method.

Solution

This object has been solved by the subject-matter of the claims of the present application as well as by the preferred embodiments thereof disclosed in this specification, i.e. by the subject matter described herein.

A first subject-matter of the present invention is a coating composition, which is a basecoat or a clearcoat composition, comprising
(A) at least one polymer as film-forming binder and as component (A),
(B) nanoparticles as component (B) containing at least one noble metal and/or alloy and/or oxide thereof, i.e., at least one noble metal and/or at least one noble metal alloy and/or at least one noble metal oxide, wherein the noble metal is in each case independently selected from the group consisting of gold, silver, copper, palladium, ruthenium, rhodium, rhenium, iridium, osmium and platinum and mixtures thereof,
(C) water and/or at least one organic solvent as component (C), said component (C) being present in the coating composition in an amount of at least 30 wt.-%, based on the total weight of the composition,
wherein the nanoparticles present as component (B) have an average particle diameter in the range of from 20 nm to <500 nm, and are present in the coating composition in an amount in the range of from 0.01 wt.-% to 10.0 wt.-%, based on the total solids content of the composition.

A further subject-matter of the present invention is a method of forming a coating film at least partially onto at least one surface of a substrate, wherein said method comprises at least step (a), namely
(a) applying the inventive coating composition at least partially onto at least one surface of an optionally pre-coated substrate to form a coating film on the surface of the substrate.

A further subject-matter of the present invention is a method of forming a coating at least partially onto at least one surface of a substrate, wherein said method comprises at least step (a) as defined above and at least step (b), namely
(b) curing the coating film obtained after performing of step (a) to form a coating on the surface of the substrate.

A further subject-matter of the present invention is a coating film or a coating, both of which are obtainable from the inventive coating composition, in particular by applying the inventive coating composition.

A further subject-matter of the present invention is an at least partially coated substrate obtainable by the inventive method. Preferably, the substrate as such prior to performing the inventive coating method is not or essentially not NIR-reflective, preferably is a dark or clear substrate.

A further subject-matter of the present invention is a use of the inventive coating and/or of the inventive at least partially coated substrate and/or of an object produced from said substrate in LIDAR visibility applications, in particular for autonomous systems such as self-driving cars.

It has been surprisingly found that this object has been in particular solved by the inventive coating composition, which scatters NIR light such as light in the range of 700 nm to 1560 nm, due to the presence of component (B) therein and its NIR light scattering properties. It has been surprisingly found that the NIR light scattering properties of component (B) with respect to the incoming wavelengths of light is in particular advantageous, because said scattering is mainly diffuse in nature and not or only to a minor extent specular in nature. It has been further found that the scattering and absorption properties of the coatings obtained from the inventive coating compositions can be finely-tuned, in particular due to the characteristics of component (B). Therefore, it is possible to produce coatings by incorporating scattering NIR particles (B) into coating compositions used for preparing these coatings, which coatings are tuned in this manner to scatter mostly NIR and minimal visible light. Thus, the coatings are transparent in the visible light range, but still reflective in the NIR light range. This is in particular useful when the inventive coating composition is used as a clearcoat composition, in particular for coating of clear substrates such as glass or plastics, since the resulting clear coating is transparent in the visible range, but still reflective in the NIR.

In addition, it has been surprisingly found that essentially only diffuse NIR scattering is observed when and achieved by making use of inventively used component (B). Such a diffuse reflection allows detection at all angles, since upon interaction of the particles (B) with incoming light, said light will interact with said particles and be radiated in all directions. In contrast to that, in case of a specular reflection, which is not or at least essentially not observed by making use of inventively used component (B), only detection from limited angles is allowed, which is in particular disadvantageous for LIDAR applications.

It has been surprisingly found that no or only a very low haze is imparted to the surface coated with the inventive coating, which is particularly advantageous for objects requiring low haze and/or for objects being sensitive to aesthetic effects such as glazing, e.g., which is particularly advantageous for the use of inventive clearcoat compositions to be applied on polymeric substrates such as polycarbonate substrates or on glass substrates.

Moreover, it has been surprisingly found that the refractive index of the coatings obtained from the inventive coating compositions can be modulated to tailor the scattering peaks of the nanoparticles (B) used. In particular, it is possible to tune the peak-reflectance wavelengths. Further, it has been found that enhanced NIR reflectance properties are observed when compared with other conventional coatings.

Further, it has been further surprisingly found that the inventively used nanoparticles (B) can be applied at small enough concentrations, that can keep the scattering and absorption in the visible spectra low, which allows a high clarity and a minimal or non-existent haze, but at the same time leads to a desired and in particular diffuse scattering in the NIR light region. At the same time, the coating compositions containing the component (B) are sprayable and the amount of component (B) contained therein allows the particles to scatter the NIR light independently, without interacting with each other in the coating compositions and in the coatings resulting therefrom.

Additionally, it has been surprisingly found that the inventive coating composition and coatings obtained therefrom are of particular use for NIR visibility applications with minimal scattering and absorption in the visible spectra, for enhanced NIR visibility applications that includes, but is not limited to, LIDAR, laser triangulation, structured light, and modulated light approaches, in particular LIDAR.

Finally, it has been found that the inventive coating composition can be in particular used as clearcoat composition, i.e., can be used to prepare a clear coating as uppermost layer of a multicoated substrate or as upper and preferably only layer of a substrate such as a polymeric substrate, in particular a polycarbonate. Surprisingly, when the inventive coating composition is used as clearcoat composition in order to prepare a clear coating as uppermost layer of a multicoated substrate, no special and expensive NIR transparent (black) pigments have to be used in any of the layers below the clearcoat layer such as the basecoat layer. Instead, conventional carbon black pigments can be used and be present in any of the layers below the clearcoat layer such as the basecoat layer without having a negative influence on NIR light scattering properties induced by making use of an inventive clearcoat composition applied thereon. In addition, it has been found that the inventive coating composition, which is a basecoat or clearcoat composition, allows any kind of primer (surfacer) layer to be present and used for preparing a multi-coated substrate, in particular a primer (surfacer) layer having a color similar to the overall coating color, so that potential chip failures to the primer layer are not as obvious. In particular, the use of only white or light colored primers as in US 2018/0120435 A1 is not necessary. Further, it has been found that the inventive coating composition can be more efficiently used in automotive refinishing methods than conventional compositions e.g. disclosed in US 2018/0120435 A1, since it is not necessary to reapply a NIR reflective primer first and then subsequently a basecoat and a clearcoat, i.e., three layers. Rather, only two layers (inventive basecoat and a clearcoat) or only one layer (inventive clearcoat) have/has to be reapplied, since component (B) being responsible for the NIR reflective properties of the resulting coating is present in either an inventive basecoat or in an inventive clearcoat composition, but not in the primer.

DETAILED DESCRIPTION OF THE INVENTION

Coating Composition

The inventive coating composition is a basecoat composition or a clearcoat composition. Preferably, the inventive coating composition is a preferably aqueous basecoat composition (in the following also referred to as waterborne basecoat composition) or an aqueous or solvent-based, more preferably a solvent-based, clearcoat composition (in the following also referred to as waterborne or solventborne clearcoat composition). More preferably, the coating composition is used as a 1K-waterborne basecoat composition or as 1K- or 2K-waterborne or solventborne, in particular as a 2K-solventborne, clearcoat composition. The inventive coating composition can be used both as OEM coating composition and for refinish applications. The inventive coating composition is in particular not a primer, primer surfacer or sealer composition and is thus not to be used/applied as a primer, primer surfacer or sealer composition.

The coating composition according to the invention is preferably suitable for producing a basecoat film. The coating composition according to the invention is therefore particularly preferably an aqueous basecoat material. The term of the basecoat is known in the art and, for example, defined in Römpp Lexikon, paints and printing inks, Georg Thieme Verlag, 1998, 10th edition, page 57. A basecoat is therefore in particular used in automotive painting and general industrial paint coloring in order to give a coloring and/or an optical effect by using the basecoat as an intermediate coating composition. This is generally applied to a metal or plastic substrate, optionally pretreated with primer and/or filler, sometimes in the case of plastic substrates also directly on the plastic substrate, and in the case of metal substrates on an electrodeposition coating layer coated onto the metal substrate or on the metal substrate already bearing a primer and/or filler and/or electrodeposition coating, or to already existing coatings in case of refinish applications, which can also serve as substrates. In order to protect a basecoat film in particular against environmental influences, at least one additional clearcoat film is applied to it. It is also possible and preferred that inventive coating composition is used as such a clearcoat composition applied onto a basecoat. In this case, however, the basecoat has preferably not been obtained also by making use of an inventive coating composition.

The term "comprising" in the context of the present invention in connection with the coating composition according to the invention preferably has the meaning "consisting of". In this case, in addition to the components (A), (B) and (C) one or more of the other components mentioned hereinafter optionally contained in the coating composition according to the invention may be contained in the coating composition according to the invention. All components can be present in each case in their preferred embodiments mentioned below.

The proportions and amounts in wt.-% (% by weight) of all components (A), (B) and (C) and further optionally present components in the coating composition according to the invention add up to 100 wt.-%, based on the total weight of the coating composition.

As used herein, the term "near-IR" or "near-infrared radiation or light" or "NIR" refers to electromagnetic radiation in the near-infrared range of the electromagnetic spectrum. Such near-IR electromagnetic radiation may have a wavelength from 700 nm to 2500 nm, such as from 800 to 1600 nm or such as from 900 nm to 1500 nm. In particular, the NIR light used has a wavelength from 700 to 1400 nm. The near-IR electromagnetic radiation source that may be used in the present invention to produce NIR light includes, without limitation, light emitting diodes (LEDs), laser diodes or any light source that is capable of emitting electromagnetic radiation having a wavelength from 700 nm to 2500 nm (in the near-IR range). The near-IR electromagnetic radiation source may be used in a LIDAR (Light Imaging, Detection and Ranging) system. The LIDAR system may utilize lasers to generate electromagnetic radiation with a wavelength from 700 to 2500 nm.

Preferably, the coating composition is able to scatter/scatters NIR light, preferably NIR light having a wavelength from 700 to 1560 nm, but substantially does not scatter and absorb light in the visible spectrum having a wavelength from 350 to <700 nm.

Preferably, the inventive coating composition does not contain any further components that are pigments. Thus, the inventive coating composition is preferably pigment-free. Preferably, the inventive coating composition does not contain any further components that are fillers. Thus, the inventive coating composition is preferably filler-free. In particular, the inventive coating composition is both pigment-free and filler-free, particularly, when it represents a clearcoat composition. In case any components are contained in the coating composition, that are pigments and/or fillers, these components preferably do not or preferably do substantially not absorb any light, that is scattered by the component (B) present in the coating composition.

The solids content of the coating composition according to the invention is preferably >5% or >10% or >15% or >20% by weight, in each case based on the total weight of the coating composition. The determination of the solids content, i.e. the non-volatile content, is carried out according to the method described hereinafter. Preferably, the solids content of the coating composition according to the invention is in a range from >5 to 50 wt.-%, more preferably from >10 to 45 wt.-%, most preferably from >12 to 40 wt.-%, in particular from >15 to 37.5 wt. %.

Component (A) of the Coating Composition

The inventive coating composition comprises at least one polymer as film-forming binder that represents component (A) of the coating composition.

For the purposes of the present invention, the term "binder" is understood in accordance with DIN EN ISO 4618 (German version, date: March 2007) to be the non-volatile constituent of a coating composition, which is responsible for the film formation. Pigments and/or fillers as well as component (B) contained therein are thus not subsumed under the term "binder". Preferably, the at least one polymer (A) is the main binder of the coating composition. As the main binder in the present invention, a binder component is preferably referred to, when there is no other binder component in the coating composition, which is present in a higher proportion based on the total weight of the coating composition.

The term "polymer" is known to the person skilled in the art and, for the purposes of the present invention, encompasses polyadducts and polymerizates as well as polycondensates. The term "polymer" includes both homopolymers and copolymers.

The at least one polymer used as component (A) may be self-crosslinking or non-self-crosslinking. Suitable polymers which can be used as component (A) are, for example, EP 0 228 003 A1, DE 44 38 504 A1, EP 0 593 454 B1, DE 199 48 004 A1, EP 0 787 159 B1, DE 40 09 858 A1, DE 44 37 535 A1, WO 92/15405 A1 and WO 2005/021168 A1.

The at least one polymer used as component (A) is preferably selected from the group consisting of polyurethanes, polyureas, polyesters, polyamides, polyethers, poly (meth)acrylates and/or copolymers of the structural units of said polymers, in particular polyurethane-poly(meth)acrylates and/or polyurethane polyureas. The at least one polymer used as component (A) is particularly preferably selected from the group consisting of polyurethanes, polyesters, poly(meth)acrylates and/or copolymers of the structural units of said polymers. The term "(meth) acryl" or "(meth) acrylate" in the context of the present invention in each case comprises the meanings "methacrylic" and/or "acrylic" or "methacrylate" and/or "acrylate".

Preferred polyurethanes are described, for example, in German patent application DE 199 48 004 A1, page 4, line 19 to page 11, line 29 (polyurethane prepolymer B1), in European patent application EP 0 228 003 A1, page 3, line 24 to page 5, Line 40, European Patent Application EP 0 634 431 A1, page 3, line 38 to page 8, line 9, and international patent application WO 92/15405, page 2, line 35 to page 10, line 32.

Preferred polyesters are described, for example, in DE 4009858 A1 in column 6, line 53 to column 7, line 61 and column 10, line 24 to column 13, line 3 or WO 2014/033135 A2, page 2, line 24 to page 7, line 10 and page 28, line 13 to page 29, line 13 described. Likewise preferred polyesters are polyesters having a dendritic structure, as described, for example, in WO 2008/148555 A1. These can be used not only in clearcoats, but also in particular aqueous basecoats.

Preferred polyurethane-poly(meth)acrylate copolymers (e.g., (meth)acrylated polyurethanes)) and their preparation are described, for example, in WO 91/15528 A1, page 3, line 21 to page 20, line 33 and in DE 4437535 A1, page 2, line 27 to page 6, line 22 described.

Preferred poly(meth) acrylates are those which can be prepared by multistage free-radical emulsion polymerization of olefinically unsaturated monomers in water and/or organic solvents. For example, seed-core-shell polymers (SCS polymers) are particularly preferred. Such polymers or aqueous dispersions containing such polymers are known, for example, from WO 2016/116299 A1. Particularly preferred seed-core-shell polymers are polymers, preferably those having an average particle size of 100 to 500 nm, which can be prepared by successive free-radical emulsion polymerization of three preferably different monomer mixtures (A1), (B1) and (C1) of olefinic unsaturated monomers in water, wherein the mixture (A1) contains at least 50 wt.-% of monomers having a solubility in water of less than 0.5 g/l at 25° C. and a polymer which is prepared from the mixture (A1), has a glass transition temperature of 10 to 65° C., the mixture (B1) contains at least one polyunsaturated monomer, and a polymer prepared from the mixture (B1) has a glass transition temperature of −35 to 15° C., and a polymer which is prepared from the mixture (C1) has a glass transition temperature of −50 to 15° C., and wherein i. first the mixture (A1) is polymerized, ii. then the mixture (B1) in the presence of the polymer formed under i. is polymerized, and iii. then the mixture (C1) in the presence of the polymer formed under ii. is polymerized. All three mixtures are preferably different from one another.

Preferred polyurethane-polyurea copolymers are polyurethane-polyurea particles, preferably those having an average particle size of 40 to 2000 nm, the polyurethane-polyurea particles, each in reacted form, containing at least one isocyanate group-containing polyurethane prepolymer containing anionic and/or groups which can be converted into anionic groups and at least one polyamine containing two primary amino groups and one or two secondary amino groups. Preferably, such copolymers are used in the form of an aqueous dispersion. Such polymers can in principle be prepared by conventional polyaddition of, for example, polyisocyanates with polyols and polyamines.

The polymer used as component (A) preferably has reactive functional groups which enable a crosslinking reaction. Any common crosslinkable reactive functional group known to those skilled in the art can be present. Preferably, the polymer used as component (A) has at least one kind of functional reactive groups selected from the group consisting of primary amino groups, secondary amino groups, hydroxyl groups, thiol groups, carboxyl groups and carbamate groups. Preferably, the polymer used as component (A) has functional hydroxyl groups.

Preferably, the polymer used as component (A) is hydroxy-functional and more preferably has an OH number in the range of 15 to 200 mg KOH/g, more preferably from 20 to 150 mg KOH/g.

The polymer used as component (A) is particularly preferably a hydroxy-functional polyurethane-poly (meth) acrylate copolymer, a hydroxy-functional polyester and/or a hydroxy-functional polyurethane-polyurea copolymer.

In addition, the coating composition of the present invention may contain at least one typical crosslinking agent known per se. Crosslinking agents are to be included among the film-forming non-volatile components of a coating composition, and therefore fall within the general definition of the "binder". Crosslinking agents are thus to be subsumed under the component (A).

If a crosslinking agent is present, it is preferably at least one aminoplast resin and/or at least one blocked or free polyisocyanate, preferably an aminoplast resin. Among the aminoplast resins, melamine resins such as melamine-formaldehyde resins are particularly preferred.

Component (B) of the Coating Composition

The inventive coating composition comprises nanoparticles as component (B), said nanoparticles containing at least one noble metal and/or at least one noble metal alloy and/or at least one noble metal oxide, wherein the noble metal is in each case independently selected from the group consisting of gold, silver, copper, palladium, ruthenium, rhodium, rhenium, iridium, osmium and platinum (Au, Ag, Cu, Pd, Ru, Rh, Re, Ir, Os and Pt) and mixtures thereof, wherein the nanoparticles present as component (B) have an average particle diameter in the range of from 20 nm to <500 nm, and are present in the coating composition in an amount in the range of from 0.01 wt.-% to 10.0 wt.-%, based on the total solids content of the composition. The method for determining the average particle diameter is disclosed hereinafter.

Component (B) can be made of the noble metal and/or noble metal alloy and/or noble metal oxide. However, the noble metal and/or noble metal alloy and/or noble metal oxide contained therein may also be only part of the component (B). For example, component (B) may contain a core and a shell, wherein one of core and shell or both contains or consists of noble metal and/or noble metal alloy and/or noble metal oxide. If only one of core and shell contains or consists of noble metal and/or noble metal alloy and/or noble metal oxide, the remaining part can be made of a different material such as another metal, semi-metal and/or oxides thereof, e.g. silica and/or zirconium oxide. The remaining part may also be a polymeric material. For example, in case component (B) contains a core and a shell, the core can be made of at least one polymer such as a polystyrene and/or a halogenated polymer and the shell can be made of at least one noble metal such as Ag.

Preferably, the nanoparticles present as component (B) in the inventive coating composition are plasmonic nanoparticles, which exhibit a plasmonic effect, in particular when used in the inventive coating composition.

Preferably, the nanoparticles present as component (B) have an average particle diameter in the range of from 25 nm to 450 nm, more preferably in the range of from nm to 400 nm, even more preferably in the range of from 25 nm to 350 nm, still more preferably in the range of from 30 nm to 300 nm.

Preferably, the nanoparticles (B) are present in the coating composition in an amount in the range of from 0.01 wt.-% to 5.0 wt.-%, more preferably in the range of from 0.02 wt.-% to 4.0 wt.-%, even more preferably in the range of from 0.02 wt.-% to 3.5 wt.-%, still more preferably in the range of from 0.02 wt.-% to 3.0 wt.-%, yet more preferably in the range of from 0.03 wt.-% to 2.5 wt.-%, further more preferably in the range of from 0.03 wt.-% to 2.0 wt.-%, in each case based on the total weight of the composition. In particular, the nanoparticles (B) are present in the coating composition in an amount in the range of from 0.03 wt.-% to 1.5 wt.-% or of from 0.04 wt.-% to 1.0 wt.-%, based on the total weight of the composition.

Preferably, the nanoparticles present as component (B) are present in the coating composition in an amount in the range of from 0.05 wt.-% to 10.0 wt.-%, more preferably in the range of from 0.075 wt.-% to 8.0 wt.-%, even more preferably in the range of from 0.1 wt.-% to 6.0 wt.-%, still more preferably in the range of from 0.15 wt.-% to 5.0 wt.-%, yet more preferably in the range of from 0.2 wt.-% to 4.0 wt.-%, further more preferably in the range of from 0.25 wt.-% to 2.0 wt.-%, most preferably in the range of from 0.30 to 1.0 wt.-%, in each case based on the total solids content of the coating composition. The method for determining the total solids content is disclosed hereinafter.

Preferably, the nanoparticles present as component (B) contain at least one noble metal, at least one noble metal alloy and/or at least one noble metal oxide, more preferably at least one noble metal and/or at least one noble metal oxide, wherein the noble metal is in each case independently selected from the group consisting of gold, silver, copper, palladium, ruthenium, rhodium, rhenium, iridium, osmium and platinum and mixtures thereof, more preferably selected from the group consisting of gold, silver, copper, and mixtures thereof.

Preferably, the nanoparticles present as component (B) are of spherical shape, in particular when nanoparticles (ii) and/or (iii) as defined hereinafter are used.

Suitable particles for use as component (B) of the inventive coating composition and methods of their preparation are known from the prior art. For example, suitable nanoparticles having a core/shell-arrangement are disclosed in WO 2007/103802 A2, WO 2008/018707 A1, U.S. Pat. No. 6,344,272 B2, US 2012/217394 A1, US 2010/0028680 A1, US 2017/0226347 A1 and WO 02/28551 A1. Further suitable particles for use as component (B) are known, e.g., from U.S. Pat. No. 9,738,559 B2.

Preferably, the nanoparticles present as component (B) are selected from the group consisting of
(i) nanoparticles having the form of plates containing or essentially consisting of at least one noble metal such as silver and/or gold, in particular silver, said plates optionally bearing a shell, said shell preferably being made of silica,
(ii) nanoparticles having a core-/shell-arrangement with a core, preferably of silica and/or zirconium oxide, and a shell made of at least one noble metal such as silver and/or gold, in particular gold, and
(iii) nanoparticles containing or essentially consisting of copper oxide and/or silver(I) oxide.

The term "copper oxide" preferably includes copper(I) oxide ($Cu_2O$, cuprous oxide), copper(II) oxide (CuO, cupric oxide) and mixtures thereof.

More preferably, the nanoparticles present as component (B) are selected from the group consisting of
(i) nanoparticles having the form of plates containing or essentially consisting of silver, said plates optionally bearing a shell made of silica,
(ii) nanoparticles having a core-/shell-arrangement with a core of silica and a shell made of gold and/or having a core-/shell-arrangement with a core of zirconium oxide and a shell made of silver and
(iii) nanoparticles containing or essentially consisting of copper oxide and/or silver(I) oxide.

Even more preferably, the nanoparticles present as component (B) are selected from the group consisting of
(i) nanoparticles having the form of plates containing or essentially consisting of silver, said plates having an average particle diameter in the range of from 20 nm to <200 nm and an average plate thickness in the range of from of 5 nm to nm, wherein the plates optionally bear a shell made of silica having an average shell thickness in the range of from of 10 nm to 50 nm,
(ii) nanoparticles having a core-/shell-arrangement with a core of silica and a shell made of gold, the core having an average particle diameter in the range of from 50 nm to <250 nm and the shell having an average thickness in the range of from of 10 nm to 50 nm.

The method for determining the average particle and average plate thickness is disclosed hereinafter.

Preferably, the nanoparticles of aforementioned option (i) have a plate thickness in nm that is less than their average particle diameter in nm. In case nanoparticles of aforementioned option (i) bear a shell, said shell thickness is preferably less than their average particle diameter in nm. Said shell thickness in nm is, however, preferably higher than their plate thickness. Preferably, the nanoparticles of aforementioned option (i) are of non-spherical shape, in particular have a triangular geometry. Preferably, the nanoparticles of aforementioned option (i) have an average particle diameter in the range of from 25 nm to 180 nm and an average plate thickness in the range of from of 5 nm to 20 nm. In case a shell is present, the average shell thickness is preferably in the range of from of 10 nm to 30 nm.

Examples of nanoparticles according to option (i) are, e.g. silver nanoplates, which are commercially available from the company nanoComposix (e.g., NanoXact silver nanoplates), which may have, but do not have to, bear a silica shell. Preferably, these particles are available with PVP (polyvinylpyrrolidine) as capping agent. These silver nanoplates are available with average particle diameters in the range of from nm to 150 nm and having an average plate thickness of 10 nm in each case. In case a shell such as a silica shell is present, the average thickness of the shell is 20 nm.

Preferably, the nanoparticles of aforementioned option (ii) have a shell thickness in nm that is less than the average particle diameter of the particles in nm. Preferably, the nanoparticles of aforementioned option (ii) are of spherical shape. Preferably, the nanoparticles of aforementioned option (ii) have a core with an average particle diameter in the range of from 50 nm to 220 nm and an average shell thickness in the range of from of 1 nm to 50 nm. The core is preferably a dielectric core.

Examples of nanoparticles according to option (ii) are, e.g. gold shell nanoshells, which are commercially available from the company nanoComposix (e.g., NanoXact gold nanoshells), which have a gold shell. Preferably, these particles are available with PVP (polyvinylpyrrolidine) or polyethylene glycol (PEG) as capping agent. These gold nanoshells are available with average particle diameters of the core in the range of from 83 nm to 200 nm and having a gold shell average thickness of 10 to 30 nm in each case.

Changing of the ratio of the core average particle diameter and the average shell thickness may tune the absorption and scattering properties of the nanoparticles of option (ii) and also of option (i) if a shell is present across the near-IR (NIR) regions of the electromagnetic spectrum. Increasing the diameter of the core such as of a silica core and decreasing the thickness of the shell such as of a gold shell can cause the plasmon resonance to shift toward the NIR range. In particular, the nanoparticles can resonant at 660 to 980 nm.

The inventively used nanoparticles (B), in particular according to option (i) and option (ii) are available with either polyethylene glycol (PEG) or polyvinylpyrrolidone (PVP) capping agents, or in a dried formulation.

Preferably, the nanoparticles of aforementioned option (iii) are of spherical shape.

Component (C) of the Coating Composition

The inventive coating composition comprises water and/or at least one organic solvent as component (C), said component (C) being present in the coating composition in an amount of at least 30 wt.-%, based on the total weight of the composition.

When the inventive coating composition comprises water, it is an aqueous or waterborne composition. In this case it is preferably a system containing as solvent mainly water, preferably in an amount of at least 20 wt.-%, and organic solvents in minor proportions, preferably in an amount of <20 wt.-%, in each case based on the total weight of the coating composition of the invention.

The coating composition according to the invention can contain a proportion of water of at least 20% by weight, more preferably of at least 25% by weight, most preferably of at least 30% by weight, in particular of at least 35% by weight, based in each case on the total weight of the coating composition of the invention.

The coating composition according to the invention can contain a proportion of water which is in a range from 20 to 65% by weight, more preferably in a range from 25 to 60% by weight, very particularly preferably in a range from 30 to 55% by weight. in each case based on the total weight of the coating composition according to the invention.

The coating composition according to the invention—when it is aqueous—can further contains a proportion of organic solvents which is in a range of <20% by weight, more preferably in a range of 0 to <20% by weight, most preferably in a range of 0.5 to <20 wt.-% or to 15 wt.-%, in each case based on the total weight of the coating composition according to the invention.

All conventional organic solvents known to those skilled in the art can be used as organic solvents for the preparation of the coating composition of the invention. The term "organic solvent" is known to those skilled in the art, in particular from Council Directive 1999/13/EC of 11 Mar. 1999. Preferably, the or are the organic solvents selected from the group consisting of monohydric or polyhydric alcohols, for example, methanol, ethanol, 1-propanol, 2-propanol, 1-butanol, ethylene glycol, ethyl glycol, propyl glycol, butyl glycol, butyl diglycol, 1,2-propanediol and/or 1,3-propanediol, ethers, for example diethylene glycol dimethyl ether, aliphatic hydrocarbons, aromatic hydrocarbons, for example toluene and/or xylenes, ketones, for example acetone, N-methylpyrrolidone, N-ethylpyrrolidone, methyl isobutyl ketone, isophorone, cyclohexanone, methyl ethyl ketone, Esters, for example methoxypropyl acetate, ethyl acetate and/or butyl acetate, amides, for example dimethylformamide and mixtures thereof.

The inventive coating composition is in particular aqueous when it is a basecoat composition.

However, the inventive coating composition may alternatively be also used a clearcoat composition, preferably as solventborne (solvent-based) composition.

In this case, it is preferably a system containing mainly at least one organic solvent as main solvent, preferably in an amount of at least 20 wt.-%, and water in minor proportions, preferably in an amount of <20 wt.-%, in each case based on the total weight of the coating composition of the invention. The coating composition according to the invention can contain a proportion of at least one organic solvent of at least 20% by weight, more preferably of at least 25% by weight, most preferably of at least 30% by weight, in particular of at least 35% by weight, based in each case on the total weight of the coating composition of the invention. The coating composition according to the invention can contain a proportion of at least one organic solvent which is in a range from 20 to 65% by weight, more preferably in a range from 25 to 60% by weight, very particularly preferably in a range from 30 to 55% by weight, in each case based on the total weight of the coating composition according to the invention. The coating composition according to the invention—when it is solventborne—can further contain a proportion of water which is in a range of <20% by weight, more preferably in a range of 0 to <20% by weight, most preferably in a range of 0.5 to <20 wt.-% or to 15 wt.-%, in each case based on the total weight of the coating composition according to the invention.

Further Optional Components of the Coating Composition

The inventive coating composition may optionally comprise one or more components, which are different from each of components (A), (B) and (C).

The coating composition of the present invention may contain one or more commonly used additives depending on the desired application. For example, the coating composition may comprise at least one additive selected from the group consisting of reactive diluents, light stabilizers, antioxidants, deaerators, emulsifiers, slip additives, polymerization inhibitors, plasticizers, initiators for free-radical polymerizations, adhesion promoters, flow control agents, film-forming auxiliaries, sag control agents (SCAs), flame retardants, corrosion inhibitors, siccatives, biocides and/or matting agents. They can be used in the known and customary proportions. Preferably, their content, based on the total weight of the coating composition according to the invention is 0.01 to 20.0 wt.-%, more preferably 0.05 to 15.0 wt.-%, particularly preferably 0.1 to 10.0% By weight, most preferably from 0.1 to 7.5% by weight, especially from 0.1 to 5.0% by weight and most preferably from 0.1 to 2.5% by weight.

The coating composition may also or additionally contain a certain amount of at least one pigment and/or at least one filler. However, as mentioned hereinbefore, the inventive coating composition preferably does not contain any further components that are pigments, in particular when it is a clearcoat composition. Thus, the inventive coating composition is preferably pigment-free. Preferably, the inventive coating composition does not contain any further components that are fillers. Thus, the inventive coating composition is preferably filler-free. In particular, the inventive coating composition is both pigment-free and filler-free. However, in case any components are contained in the coating composition, that are pigments and/or fillers, these components preferably do not or preferably do substantially not absorb any light, that is scattered by the component (B) present in the coating composition. Such pigments may be used for coloring purposes both when the coating composition is a basecoat composition and when the coating composition is a (tinted) clearcoat composition.

The term "pigment" includes color pigments and effect pigments. A person skilled in the art is familiar with the term effect pigments. A corresponding definition can be found, for example, in Römpp Lexikon, Lacke and Druckfarben, Georg Thieme Verlag, 1998, 10th Edition, pages 176 and 471. A definition of pigments in general, and further specifications thereof are disclosed in DIN 55943 (date: October 2001). Effect pigments are preferably pigments which have an optical effect or a color and optical effect. Examples of effect pigments are platelet-shaped metallic effect pigments such as platelet-shaped aluminum pigments, gold bronzes, fire-colored bronzes and/or iron oxide-aluminum pigments, perglaze pigments and/or metal oxide-mica pigments (mica). A person skilled in the art is familiar with the concept of color pigments. The terms "coloring pigment" and "color pigment" are interchangeable. As a color pigment inorganic and/or organic pigments can be used. Preferably, the color pigment is an inorganic color pigment. Particularly preferred color pigments used are white pigments, colored pigments and/or black pigments. Examples of white pigments are titanium dioxide, zinc white, zinc sulfide and lithopone. Examples of black pigments are carbon black, iron manganese black and spinel black. Examples of colored pigments are chromium oxide, chromium oxide hydrate green, cobalt green, ultramarine green, cobalt blue, ultramarine blue, manganese blue, ultramarine violet, cobalt and manganese violet, iron oxide red, molybdate red and ultramarine red, iron oxide brown, mixed brown, spinel and corundum phases and chromium orange, iron oxide yellow, nickel titanium yellow, chrome titanium yellow, cadmium sulfide, cadmium zinc sulfide, chrome yellow and bismuth vanadate. The term "filler" is known to the person skilled in the art, for example from DIN 55943 (date: October 2001). For the purposes of the present invention, a "filler" is understood to mean a substance which is essentially insoluble in the application medium, for example the coating composition according to the invention and which is used in particular for increasing the volume. In the context of the present invention, "fillers" preferably differ from "pigments" by their refractive index, which for fillers is <1.7, but for pigments is ≥1.7. Examples of suitable fillers are kaolin, dolomite, calcite, chalk, calcium sulfate, barium sulfate, talc, silicic acids, in particular pyrogenic silicic acids, hydroxides such as aluminum hydroxide or magnesium hydroxide or organic fillers such as textile fibers, cellulose fibers and/or polyethylene fibers; in addition, reference is made to Römpp Lexikon Lacke and Druckfarben, Georg Thieme Verlag, 1998, pages 250 ff., "Fillers". If one or more pigments and/or fillers are present in the coating composition, the proportion thereof in the coating composition is preferably in the range from 1.0 to 40.0% by weight, preferably 2.0 to 35.0% by weight, particularly preferably 5.0 to 30.0% by weight, in each case based on the total weight of the coating composition.

The coating composition according to the invention may optionally contain at least one thickener. Examples of such thickeners are inorganic thickeners, for example metal silicates such as sheet silicates, and organic thickeners, for example poly(meth)acrylic acid thickeners and/or (meth) acrylic acid (meth)acrylate copolymer thickeners, polyurethane thickeners and polymeric waxes. Such organic thickeners are encompassed by the polymer (A) used as binder. The inorganic thickeners are different from any of components (A), (B) and (C). The metal silicate is preferably selected from the group of smectites. The smectites are particularly preferably selected from the group of montmorillonites and hectorites. In particular, the montmorillonites and hectorites are selected from the group consisting of aluminum-magnesium silicates and sodium-magnesium and sodium-magnesium fluorine-lithium phyllosilicates. These inorganic phyllosilicates are marketed, for example, under the trademark Laponite®. Thickeners based on poly (meth) acrylic acid and (meth) acrylic acid (meth) acrylate copolymer thickeners are optionally crosslinked and or neutralized with a suitable base. Examples of such thickening agents are "Alkali Swellable Emulsions" (ASE), and hydrophobically modified variants thereof, the "Hydrophically Modified Alkali Swellable Emulsions" (HASE). Preferably, these thickeners are anionic. Corresponding products such as Rheovis® AS 1130 are commercially available. Polyurethane based thickeners (e.g., polyurethane associative thickeners) are optionally crosslinked and/or neutralized with a suitable base. Corresponding products such as Rheovis® PU 1250 are commercially available. Examples of suitable polymeric waxes are optionally modified polymeric waxes based on ethylene-vinyl acetate copolymers. A corresponding product is commercially available, for example, under the name Aquatix® 8421.

The at least one thickener in the coating composition according to the invention is preferably present in an amount of at most 10% by weight, more preferably at most 7.5% by weight, most preferably at most 5% by weight, especially at most 3% by weight. %, most preferably not more than 2% by weight, based in each case on the total weight of the coating composition. The minimum amount of thickener is preferably in each case 0.1% by weight, based on the total weight of the coating composition.

The preparation of the coating composition can be carried out using customary and known preparation and mixing methods and mixing units, or using conventional dissolvers and/or stirrers.

Coating Films and Coatings

A further subject-matter of the present invention is a coating film or a coating, both of which are obtainable from the inventive coating composition, in particular by applying the inventive coating composition.

All preferred embodiments described above herein in connection with the inventive coating composition and the preferred embodiments thereof are also preferred embodiments of the inventive coating film and the inventive coating.

Preferably, the inventive coating film and the inventive coating are present at least partially on the surface of a substrate, said substrate being not or essentially not NIR-reflective, said substrate being preferably a dark or clear substrate. Dark substrates are in particular substrates bearing a dark colored multilayer film. In particular in this case, the dark color can be a result of the use of carbon black pigments in a coating layer of the multicoat film such as in the basecoat layer.

Preferably, the inventive coating film and the inventive coating are able to scatter/scatters near-infrared (NIR) light having a wavelength from 700 to 1560 nm, but substantially does not scatter and absorb light in the visible spectrum having a wavelength from 350 to <700 nm. The method of determining and investigating the NIR light scattering behavior is disclosed hereinafter.

Inventive Methods

A further subject-matter of the present invention is a method of forming a coating film at least partially onto at least one surface of a substrate, wherein said method comprises at least step (a), namely
  (a) applying the inventive coating composition at least partially onto at least one surface of an optionally pre-coated substrate to form a coating film on the surface of the substrate.

A further subject-matter of the present invention is a method of forming a coating at least partially onto at least one surface of a substrate, wherein said method comprises at least step (a) as defined above and at least step (b), namely
  (b) curing the coating film obtained after performing of step (a) to form a coating on the surface of the substrate.

All preferred embodiments described above herein in connection with the inventive coating composition, the inventive coating film and the inventive coating and the preferred embodiments thereof, are also preferred embodiments of the inventive methods of forming a coating film and a coating.

When the inventive coating composition is a—preferably aqueous—basecoat coating composition, step (a) or steps (a) and (b) is/are preferably carried out onto at least one surface of an pre-coated substrate, if the substrate is a metal substrate. Said metal substrate then preferably bears a primer and/or filler and/or electrodeposition coating as pre-coating(s). If the substrate is a plastic (polymeric) substrate, it may be a pre-coated substrate, which, e.g., bears a primer coating, but does not have to. Independent of the substrate used, after having performed step (a) or steps (a) and (b), preferably a clearcoat composition is applied onto the basecoat coating formed by making use of the inventive coating composition. Preferably, said clearcoat composition is different from the inventive basecoat composition and in particular does not contain component (B).

When the inventive coating composition is a—preferably solventborne—clearcoat coating composition, step (a) or steps (a) and (b) is/are preferably carried out onto at least one surface of a pre-coated substrate, if the substrate is a metal substrate. Said metal substrate preferably bears a primer and/or filler and/or electrodeposition and/or basecoat coating as pre-coating(s). The basecoat coating is in this case preferably not obtained by making use of an inventive coating composition. If the substrate is a plastic (polymeric) substrate, it may be a pre-coated substrate, which, e.g., bears a primer coating, but does not have to, i.e. the inventive clearcoat composition may be directly applied to the substrate. The substrate may also be a glass substrate, in particular when the inventive coating composition is a clearcoat composition.

In case the inventive coating composition is a clearcoat composition, it is preferably applied as outer(most) coating (film) layer in the inventive methods.

The inventive coating composition can be coated on an object by numerous techniques well-known in the art, including spray coating, drop coating, dip coating, roll coating, curtain coating, and other techniques. It can be applied wet-on-wet, but does not have to.

The substrate used can be a plastic substrate, i.e., a polymeric substrate. Preferably, thermoplastic polymers are used as such substrates. Suitable polymers are poly(meth)acrylates including polymethyl(meth)acrylates, polybutyl (meth)acrylates, polyethylene terephthalates, polybutylene terephthalates, polyvinylidene fluorides, polyvinyl chlorides, polyesters, including polycarbonates and polyvinyl acetate, polyamides, polyolefins such as polyethylene, polypropylene, polystyrene, and also polybutadiene, polyacrylonitrile, polyacetal, polyacrylonitrile-ethylene-propylene-diene-styrene copolymers (A-EPDM), ASA (acrylonitrile-styrene-acrylic ester copolymers) and ABS (acrylonitrile-butadiene-styrene copolymers), polyetherimides, phenolic resins, urea resins, melamine resins, alkyd resins, epoxy resins, polyurethanes, including TPU, polyetherketones, polyphenylene sulfides, polyethers, polyvinyl alcohols, and mixtures thereof. Polycarbonates and poly(meth)acrylates are especially preferred.

The substrate used can also be a metal such as steel and/or aluminum. Further, the substrate used can be glass or textiles, in particular glass.

Preferably, the substrate used is not or essentially not NIR-reflective. More preferably, the substrate is a dark or clear substrate. Dark substrates are in particular substrates such as metals or plastics, for instance polycarbonate, bearing a dark colored multilayer film such as a black colored film. A clear substrate is for example glass or a polycarbonate substrate.

Substrate

A further subject-matter of the present invention is an at least partially coated substrate obtainable by the inventive method. Preferably, the substrate as such prior to performing the inventive coating method is not or essentially not NIR-reflective, preferably is a dark or clear substrate. Dark substrates are in particular substrates bearing a dark colored multilayer film such as a black colored film. A clear substrate is for example glass or a polycarbonate substrate.

All preferred embodiments described above herein in connection with the inventive coating composition, the inventive coating film, the inventive coating, as well as the inventive methods of forming a coating film and a coating, and the preferred embodiments thereof, are also preferred embodiments of the inventive substrate.

The coated substrates can be used to produce, e.g., lane markers, road barriers and signage as well as automotive parts.

Use

A further subject-matter of the present invention is a use of the inventive coatings and/or the inventive at least partially coated substrates and/or objects produced from said substrates in LIDAR visibility applications, in particular for autonomous systems such as self-driving cars.

All preferred embodiments described above herein in connection with the inventive coating composition, the inventive coating film, the inventive coating, as well as the inventive methods of forming a coating film and a coating and the inventive partially coated substrate, and the preferred embodiments thereof, are also preferred embodiments of the inventive use.

The inventive use allows a benefit from better infrared light and LIDAR visibility, in particular for autonomous systems such as self-driving cars, in particular since the inventive coating/coating film and the inventive substrate/object is preferably virtually colorless and transparent in the visible-light range.

Methods

1. Solid Content

The amount of solid content (non-volatile matter) including the total solid content is determined via DIN EN ISO 3251:2008-06 at 110° C. for 60 min.

2. Average Particle Diameter

The average particle diameter is determined according to ISO/DIS 21363:2018-09 by transmission electron microscopy (TEM).

3. Average Plate Thickness and Average Shell Thickness

The average plate thickness and average shell thickness are also determined according to ISO/DIS 21363:2018-09 by transmission electron microscopy (TEM).

4. Determination of Near-Infrared (NIR) Light Scattering Properties

The determination is carried out by measurement of the bi-directional spectral reflectance distribution or by a simulation approach, since the simulation approach is in full agreement with the measurements.

The quantity being measure is the bi-directional spectral reflectance distribution. The following setup is used for this measurement: the sample such as a coating layer present on a substrate is illuminated by a white light halogen lamp at angles of incidence from 0° to 80° in 5° steps (angle of incidence defined with respect to normal of the sample). Then, the spectral reflectance of the sample is measured with a spectrometer from 380 to 995 nm in 5 nm increments at angles of observation varying from −85° to 85° in 5° steps (angle of observation defined with respect to normal of the sample). Next, the spectral reflectance is calibrated using a PTFE standard that reflects incident light with nearly Lambertian reflectance characteristics. The coating layer has a dry film thickness of 20 μm. The substrate is an absorbing/black substrate.

The simulation approach is used to simulate scattering properties (scattering and absorption cross section, angular scattering intensity) of nanoparticles used as component (B) by wave-optical simulations. Alternatively, Mie theory can be used for numerical calculation of same nanoparticle scattering properties. The obtained scattering properties are then applied to a coating layer volume in ray-tracing software and reflectance characteristics of such a coating layer (and optionally more layers) by ray-tracing simulations are simulated.

The Ray-optical simulations (with commercial Raytracing-Software LightTools) are performed as follows: a CAD model of a coating is created with at least a bottom layer, being a perfectly absorbing substrate, and a top layer, being a 20 μm thick homogeneous medium (n=1.6, k=0) with volume scatter properties according to the previous wave-optical nanoparticle scatter simulations (transmission calculated from scatter and absorption cross section of the nanoparticles; free mean path calculated from scatter and absorption cross section and particle density; angular scattering distribution obtained directly from previous simulation). For simulation of color, the coating is illuminated by 200 million rays incident at 45° angle of incidence with respect to surface normal of the coating; spectral distribution of rays is homogeneous from 400 nm to 1600 nm. The spectral reflectance of the coating is evaluated by spectral receivers at −60°, −30°, −20°, 0°, 30° and 65° with respect to angle of incidence.

EXAMPLES

The following examples further illustrate the invention but are not to be construed as limiting its scope. In the following, all amounts given in the Tables are parts by weight if not indicated otherwise.

1. Preparations of Coating Compositions

A comparative coating composition C1 has been prepared by mixing the components listed in Table 1 in this order. In the same manner an inventive coating composition I1 has been prepared. I1 differs from C1 in that it contains an inventively used additive (component L).

TABLE 1

Components of C1 and I1

| | Components | C1 | I1 |
|---|---|---|---|
| A | Laponite ® RD solution | 8.5 | 8.5 |
| B | Deionized water | 3.1 | 3.1 |
| C | polyurethane resin dispersion | 8.1 | 8.1 |
| D | polyurethane acrylic resin dispersion | 4.8 | 4.8 |
| E | Daotan ® VTW 6462 | 9.2 | 9.2 |
| B | Deionized water | 0.9 | 0.9 |
| F | Melamine resin | 5.5 | 5.5 |
| G | Ethylene glycol monoalkyl ether | 2.4 | 2.4 |
| H | Surfactant | 0.3 | 0.3 |
| I | Wetting additive | 0.2 | 0.2 |
| J | Transparent paste resin blend | 5.4 | 5.4 |
| K | Propylene glycol monoalkyl ether | 1.7 | 1.7 |
| L | Additive solution | 0 | 50.0 |
| B | Deionized water | 50.0 | 0 |
| | Σ | 100.1 | 100.1 |

Component A is a colloidal layered silicate solution that includes 92.7 parts by weight of deionized water 3.5 parts by weight of a colloidal layered silicate that is commercially available under the trade name Laponite® RD and 3.5 parts by weight of the commercial product Pluracol® P1010.

Component C is dispersion of a dimer fatty acid-based polyurethane resin having an acid number of 23 and a weight average molecular weight of 15k Daltons having a solids content of 28 wt.-% and is further described by U.S. Pat. No. 4,791,168.

Component D is a polyurethane acrylic resin dispersion as described in example D of U.S. Pat. No. 6,001,915.

Component E is Daotan® VTW 6462, which is commercially available from Allnex. Component F is a melamine resin and is available under the trade name Cymel®327 from Allnex. Component G is an ethylene glycol monoalkyl ether solvent available under the trade name Butyl Cellosolve® from Dow Chemical Company. Component H is a commercially available surfactant. Component I is commercially available wetting additive. Component K is a propylene glycol monoalkyl ether solvent available under the trade name Dowanol™ PnB Glycol Ether from The Dow Chemical Company.

Component J is a blend of (i) 2.75 parts by weight of a polyester resin dispersion, said polyester being composed of a dimer fatty acid, hexane diol, isophthalic acid and trimellitic anhydride and having an acid value of 30 mg KOH/g, the dispersion having a solids content of 73 wt.-% and the remainder of the dispersion being a blend of butanol and Dowanol™ PnP, of (ii) 3.5 parts by weight of component G and (iii) 0.05 parts by weight of N,N-dimethyl ethanolamine.

Component L is a commercially available gold nanoshell solution of the company nanoComposix containing gold nanoshells comprising a silica core of about 120 nm core diameter, a gold shell surrounding the core having a thickness of about 20 nm and a polyethylene glycol capping agent, that is bound covalently to the surface of the particle. The content of the nanoshells in the solution is about 0.1 wt.-%. The remainder is deionized water.

2. Coated Substrates and Properties Thereof 2.1 A substrate (S) is coated with comparative coating composition C1. Another substrate (S) is coated with inventive coating composition I1. The substrate (S) is a metal substrate in each case, which bears a black colored basecoat, which is commercially available (T12M Metopac® metal panel by Leneta). After coating the substrate (S) with either (C1) or (I1) and a flash-off period, the coating on the substrate is in each case physically dried at a temperature of 100° C. for 2 hours. The dry film thickness of the resulting coating layer obtained from (C1) or (I1), respectively, was 20 μm. In case of (I1) the coating layer contains 0.38 wt.-% of nanoparticles (B) originating from component L, based on the total weight of the coating layer.

2.2 The bi-directional spectral reflectance distribution of the coatings obtained has been measured and also been obtained by simulation by the aforementioned methods of determination.

Figure 1:
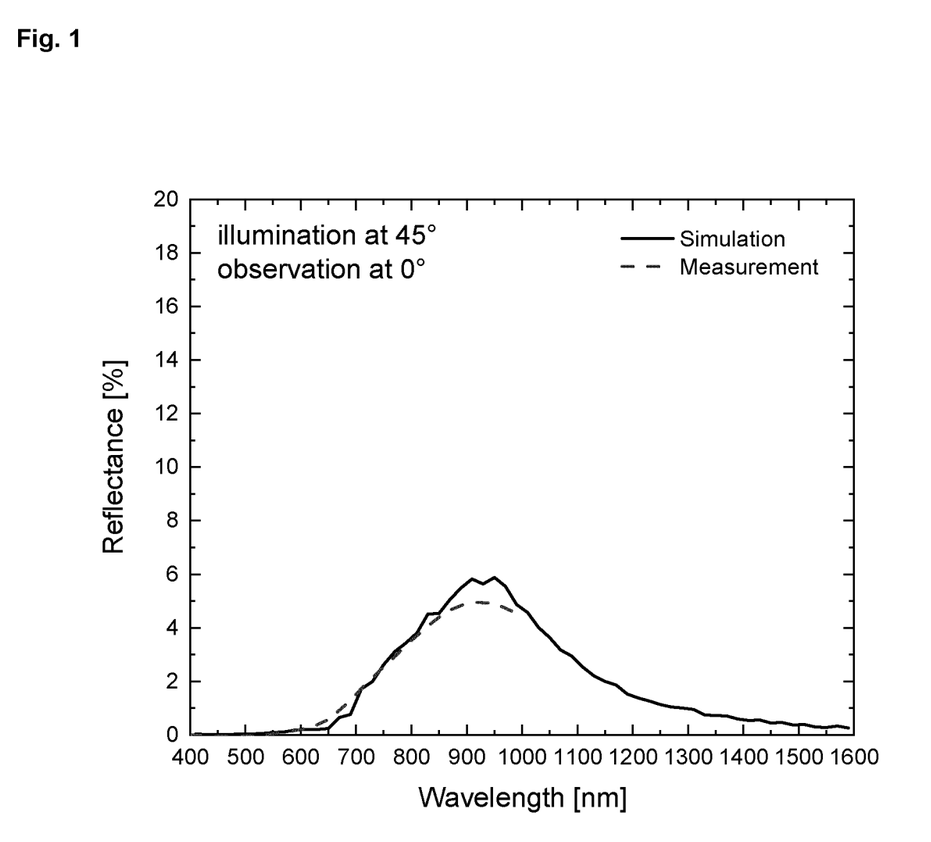
Figure 2:
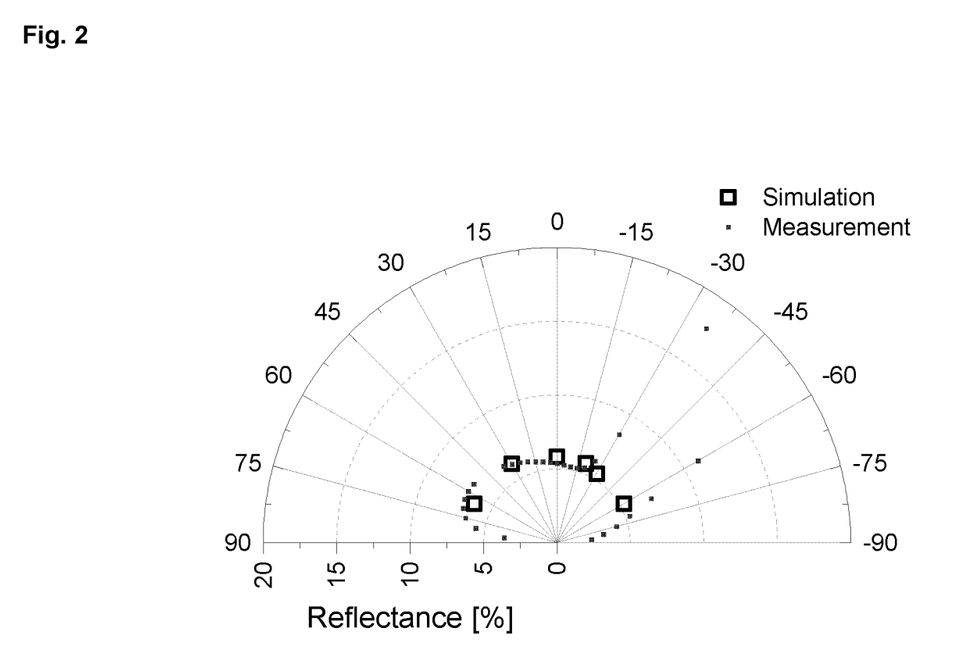

The results are displayed in FIG. 1 and FIG. 2. It is evident from these figures that the simulations agree well with the measurements.

In FIG. 1, the measured and simulated spectral reflectance is shown for 45° angle of incident of illumination and 0° angle of observation. The measured data were corrected for imperfect absorption by the black substrate (S) using reference data from the second sample (substrate S coated with C1 without any nanoparticles). The imperfect absorption of the black substrate is about 0.4% absolute.

In FIG. 2, the angular distribution of simulated and measured reflectance at 905 nm wavelength is shown. The sample is again illuminated at 45° angle of incidence. The increased broader reflection at −45° in the measurement data results from specular reflection at the air/coating interface and saturation of the applied spectrometer. The measured data has been corrected in the same way as described above for FIG. 1.

The invention claimed is:

1. A coating composition, which is a basecoat or a clearcoat composition, comprising
    (A) at least one polymer as film-forming binder and as component (A),
    (B) nanoparticles as component (B) containing at least one noble metal and/or alloy and/or oxide thereof, wherein the noble metal is in each case independently selected from the group consisting of gold, silver, copper, palladium, ruthenium, rhodium, rhenium, iridium, osmium and platinum and mixtures thereof, and
    (C) water and/or at least one organic solvent as component (C), said component (C) being present in the coating composition in an amount of at least 30 wt.-%, based on the total weight of the composition,
    wherein the nanoparticles present as component (B) have an average particle diameter in the range of from 20 nm to <500 nm, and are present in the coating composition in an amount in the range of from 0.01 wt.-% to 10.0 wt.-%, based on the total solids content of the composition.

2. The coating composition according to claim 1, characterized in that the nanoparticles present as component (B) have an average particle diameter in the range of from 25 nm to <300 nm.

3. The coating composition according to claim 1, characterized in that the nanoparticles present as component (B) are present in the coating composition in an amount in the range of from 0.01 wt.-% to 6.0 wt.-%, based on the total solids content of the composition.

4. The coating composition according to claim 1, characterized in that the nanoparticles present as component (B) contain at least one noble metal, at least one noble metal alloy and/or at least one noble metal oxide, wherein the noble metal is each case independently selected from the group consisting of gold, silver, copper and mixtures thereof.

5. The coating composition according to claim 1, characterized in that the solids content of the coating composition is in a range of from >5 to 50 wt.-%.

6. The coating composition according to claim 1, characterized in that the nanoparticles present as component (B) are selected from the group consisting of
    (i) nanoparticles having the form of plates containing or essentially consisting of at least one noble metal, silver, and/or gold, said plates optionally bearing a shell,
    (ii) nanoparticles having a core-/shell-arrangement with a core and a shell made of at least one noble metal, silver, and/or gold, and
    (iii) nanoparticles containing or essentially consisting of copper oxide and/or silver(I) oxide.

7. The coating composition according to claim 1, characterized in that the nanoparticles present as component (B) are selected from the group consisting of
    (i) nanoparticles having the form of plates containing or essentially consisting of silver, said plates having an average particle diameter in the range of from 20 nm to <200 nm and an average plate thickness in the range of from of 5 nm to 35 nm, wherein the plates optionally bear a shell made of silica having an average shell thickness in the range of from of 10 nm to 50 nm, and
    (ii) nanoparticles having a core-/shell-arrangement with a core of silica and a shell made of gold, the core having an average particle diameter in the range of from 50 nm to <250 nm and the shell having an average thickness in the range of from of 10 nm to 50 nm.

8. The coating composition according to claim 1, characterized in that it scatters near-infrared (NIR) light having a wavelength from 700 to 1560 nm, but substantially does not scatter and absorb light in the visible spectrum having a wavelength from 350 to <700 nm.

9. The coating composition according to claim 1, characterized in that it does not contain any further components that are pigments.

10. A method of forming a coating film at least partially onto at least one surface of a substrate, wherein said method comprises at least step (a), namely
    (a) applying the coating composition according to claim 1 at least partially onto at least one surface of an optionally pre-coated substrate to form a coating film on the surface of the substrate.

11. A method of forming a coating at least partially onto at least one surface of a substrate, wherein said method comprises at least step (a) as defined in claim 10 and at least step (b), namely
    (b) curing the coating film obtained after performing of step (a) to form a coating on the surface of the substrate.

12. A coating film obtainable from the coating composition according to claim 1.

13. An at least partially coated substrate obtainable by the method according to claim 11.

14. The at least partially coated substrate of claim 13, characterized in that the substrate as such prior to performing the coating method of claim 11 is not or essentially not NIR-reflective.

15. A method of using the at least partially coated substrate of claim 13 and/or of an object produced from said substrate, the method including a step of subjecting said at least partially coated substrate of claim 13 and/or an object produced from said substrate to LiDAR visibility applications.

16. The coating composition according to claim 1, characterized in that the nanoparticles present as component (B) are selected from the group consisting of
    (i) nanoparticles having the form of plates containing or essentially consisting of at least one noble metal, silver, and/or gold, said plates optionally bearing a shell made of silica,
    (ii) nanoparticles having a core-/shell-arrangement with a core made of silica and/or zirconium oxide, and a shell made of at least one noble metal, silver, and/or gold, and
    (iii) nanoparticles containing or essentially consisting of copper oxide and/or silver(I) oxide.

17. A coating film obtainable by the method of claim 10.

18. A coating obtainable from the coating composition according to claim 1.

19. A coating obtainable by the method of claim 11.

20. The at least partially coated substrate of claim 13, characterized in that the substrate as such prior to performing the coating method is a dark or clear substrate.

21. The coating composition according to claim 1, characterized in that the nanoparticles present as component (B) are selected from the group consisting of (i) nanoparticles having the form of plates containing or essentially consisting of at silver, said plates optionally bearing a shell,
(ii) nanoparticles having a core-/shell-arrangement with a core and a shell made of at least one noble metal, silver, and/or gold, and
(iii) nanoparticles containing or essentially consisting of copper oxide and/or silver(I) oxide.

22. The coating composition according to claim 1, characterized in that the nanoparticles present as component (B) are selected from the group consisting of
(i) nanoparticles having the form of plates containing or essentially consisting of silver, said plates optionally bearing a shell made of silica,
(ii) nanoparticles having a core-/shell-arrangement with a core made of silica and/or zirconium oxide, and a shell made of gold, and
(iii) nanoparticles containing or essentially consisting of copper oxide and/or silver(I) oxide.

23. The coating composition according to claim 1, characterized in that the nanoparticles present as component (B) are present in the coating composition in an amount in the range of from 0.01 wt.-% to 2.0 wt.-% based on the total solids content of the composition.

24. The coating composition according to claim 1, characterized in that the nanoparticles present as component (B) are present in the coating composition in an amount in the range of from 0.01 wt.-% to 1.0 wt.-% based on the total solids content of the composition.

* * * * *